Nov. 23, 1954   H. W. WIRE   2,694,862
DIAL INDICATOR GAUGE ADAPTER
Filed Feb. 27, 1953
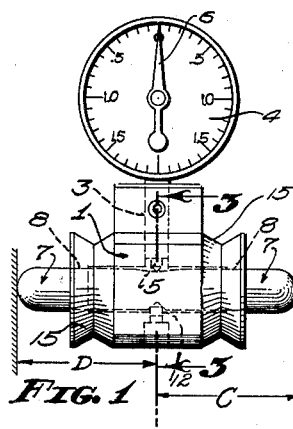
FIG. 1
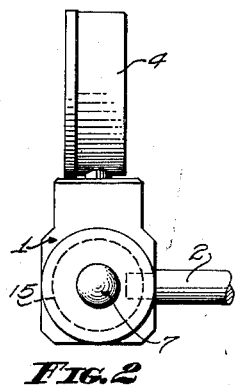
FIG. 2
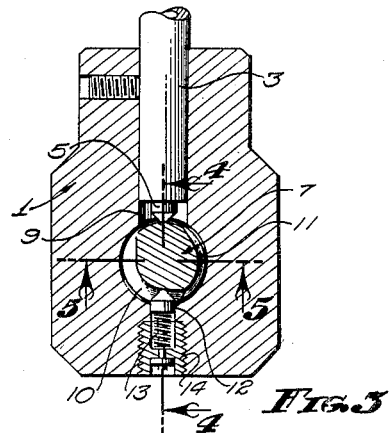
FIG. 3
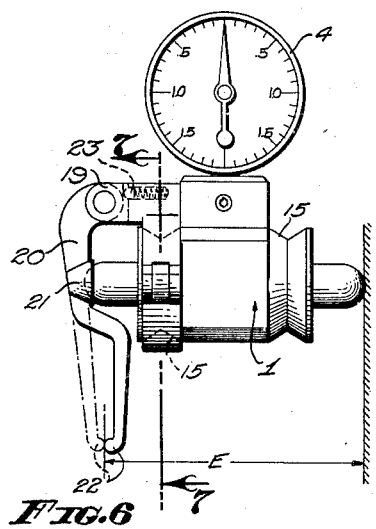
FIG. 6
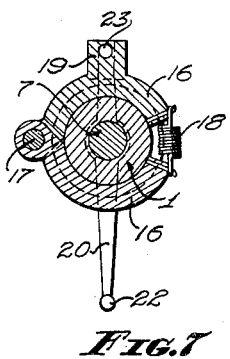
FIG. 7
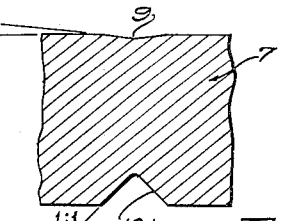
FIG. 4
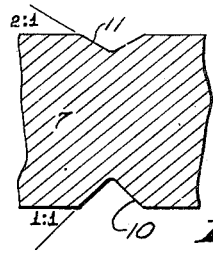
FIG. 5
INVENTOR.
HARRY W. WIRE
BY
ATTORNEYS

United States Patent Office 2,694,862
Patented Nov. 23, 1954

2,694,862

DIAL INDICATOR GAUGE ADAPTER

Harry W. Wire, Los Angeles, Calif.

Application February 27, 1953, Serial No. 339,198

3 Claims. (Cl. 33—172)

My invention relates to dial indicator gage adapters, and included in the objects of my invention are:

First, to provide an adapter for use with dial gages which greatly increases the uses of the dial gage, particularly in connection with machining, milling, grinding or inspection operations wherein the dial gage may be mounted in a fixed position and the work pieces checked as to critical dimensions, without in many cases removing the work piece from the machine.

Second, to provide a dial gage adapter which may be quickly adjusted for checking or inspecting selected dimensions of work pieces, whereupon the work pieces may be readily and quickly checked even by an inexperienced person.

Third, to provide a dial gage adapter wherein the dial gage indication and accuracy may be increased by one or more selected factors, such as five or ten times, and wherein such change in scale may be readily and quickly made.

Fourth, to provide an adapter for use with dial gages which incorporates a novel lever and mounting means which materially increases the range of application of the gage.

With the above and other objects in view, as may appear hereinafter, reference is directed to the drawings, in which:

Figure 1 is a front view of my dial indicator gage adapter.

Figure 2 is an end view thereof.

Figure 3 is an enlarged fragmentary sectional view thereof through 3—3 of Figure 1.

Figure 4 is an enlarged sectional view through the gage bar taken along the line 4—4 of Figure 3.

Figure 5 is a similar enlarged fragmentary sectional view of the gage bar taken along the line 5—5 of Figure 3.

Figure 6 is a front view of my dial indicator gage adapter showing an extension lever structure mounted thereon.

Figure 7 is a sectional view thereof through 7—7 of Figure 6.

My dial indicator gage adapter includes a body or block 1 having a longitudinal bore and a transverse bore. The body is supported by a mounting stem 2 which is suitably supported by adjustable bracket means (not shown). The transverse bore receives the stem 3 of a dial gage 4, which may be conventional. A set screw secures the stem 3 in place.

Protruding from the stem 3 is a sensing tip 5, the movement of which causes rotation of the dial gage pointer 6. The longitudinal bore of the body 1 receives a gage bar 7, the ends of which protrude from the ends of the body and are rounded or pointed. It is desirable that the gage bar slide in the body 1, however, the tolerances are held to a minimum to avoid any wobble or play. Accurate movement of the gage bar is enhanced by relieving the central portion of the longitudinal bore, thus forming bearing lands 8 at the extremities of the longitudinal bore.

The gage bar is provided with a movement translating V groove 9 which is engaged by the sensing tip 5 of the dial gage. The wall slope of the V groove 9 is selected so that any movement of the gage bar will cause a predetermined relative movement of the sensing tip and the dial gage pointer; for example, the wall slope of the V groove 9 may be such as to produce a 10:1 ratio between the movement of the bar and the sensing tip. Thus if the dial gage is graduated to indicate .001 the 10:1 ratio groove will increase the dial scale to indicate .0001.

The groove 9 may occupy the entire periphery of the gage bar but preferably occupies only a segment and other movement translating V grooves are formed in the gage bar in order to provide different ranges of operation; for example, a V groove 10 having a wall slope to provide a 1:1 ratio may be provided in the same transverse plane as the V groove 9. If desired a third movement translating groove 11 may be provided which will give a 5:1 ratio.

It is preferred to so arranged the V groove 10 that it extends diametrically opposite both the grooves 9 and 11. Thus, when either of these grooves is engaged by the sensing tip 5, the 1:1 groove 10 occupies a diametrically opposite position. The body is provided with a bore in alignment with the cross bore which receives the dial gage stem 3 and mounted therein is a retainer pin 12 which normally engages the V groove 10. The retainer pin 12 is urged by a spring 13 suitably guided by a screw threaded guide plug 14 fitted into the body 1.

Operation of my dial indicator gage adapter is as follows:

The device is suitably supported by the mounting stem 2 and associated bracket means in some fixed position relative to a surface A, which may be horizontal or vertical or in any other plane. The work piece to be checked is inserted between the corresponding end of the gage bar 7 and the reference plane A so that the dimension indicated by B can be ascertained. Also by mounting the body member in a fixed position the work piece may be brought against the end of the dial gage and such dimensions as the dimension C or D may be ascertained.

It should be observed that quite frequently my device is used in connection with machine tools and, for example, may be used to measure pertinent essential distances on work being turned in lathes or other dimensions of work being milled. It is frequently possible to mount the device so that it can be moved laterally from its measuring position without disturbing the essential position of the body so that in production operations a series of work pieces may be checked for accuracy.

It is desirable at times to determine the dimension of a work piece located laterally from the gage bar 7. This is accomplished by the use of a lever assembly movably attachable to the body 1. For this purpose the ends of the body 1 from which the gage bar 7 protrudes are provided with annular channels 15, preferably of V-shaped cross section; that is, one channel is provided at each end of the body. Either channel is adapted to receive a pair of clamp jaws 16 joined by a hinge pin 17 and by a spring 18 so that the clamp jaws fit snugly and without play within the channel. One of the clamp jaws is provided with a bracket arm 19 to which is pivotally connected a lever 20 adapted to extend over the corresponding end of the gage bar 7.

The lever 20 is provided with a seat 21 which is engaged by the gage bar and a sensing tip 22 located laterally from the gage bar. The shape of the lever 20 may be so that the sensing tip 22 faces to the left as viewed in Figure 6 and indicated by solid lines, or to the right as indicated by broken lines in Figure 6. It is preferred that the distance between the fulcrum of the lever 20, that is, its pivotal connection with the bracket arm 19, be one-half the distance between the center of the gage bar 7 and the sensing tip 22. Also the engaging end of the sensing tip is the center of movement between the seat 21 and the gage bar 7, and the hinged connection between the lever 20 and bracket 19 should occupy a common plane, or nearly so. In order to hold the seat 21 in engagement with the end of the gage bar 7 a spring 23 may be mounted in the bracket arm 19 and arranged to bear against the lever 20.

As will be seen in Figure 6, the lever assembly enables a dimension E to be ascertained or a dimension between the sensing tip 22 and some point fixed with respect to the body 1.

The lever assembly may be quickly secured to the body or removed therefrom. Also it may be rotated to any position around the axis of the gage bar 7.

Inasmuch as it is desirable to provide a 2:1 leverage in order to place the sensing tip of the lever at a convenient distance from the body 1, the 5:1 V groove 11 may be used so that the net effect is a 10:1 ratio between movement of the sensing tip 22 and the sensing tip 5 of the dial indicator gage.

Having fully described my invention, it is to be understood that I do not wish to be limited to the details herein set forth, but my invention is of the full scope of the appended claims.

I claim:

1. An adapter for dial indicator gages, comprising: a body structure having a first bore adapted to receive the stem and sensing tip of a dial indicator gage, and a second bore traversing the first bore; and a gage bar slidable and rotatable in said second bore and having a plurality of movement translating grooves, the side walls of which bear different angular relation to the axis of the gage bar, said side walls adapted to move said sensing tip in the axis of the first bore upon movement of said gage bar in the axis of the second bore.

2. An adapter for dial indicator gages, comprising: a body structure having a first bore adapted to receive the stem and sensing tip of a dial indicator gage, and a second bore traversing the first bore; a gage bar slidable and rotatable in said second bore and having a plurality of movement translating grooves, the side walls of which bear different angular relation to the axis of the gage bar, said side walls adapted to move said sensing tip in the axis of the first bore upon movement of said gage bar in the axis of the second bore; journal means at an end of said body structure from which protrudes said gage bar; a collar removably mounted on said journal means; and a lever pivotally connected to said collar, overhanging said gage bar and terminating in a sensing tip.

3. An adapter for dial indicator gages, comprising: a body structure having a first bore adapted to receive the stem and sensing tip of a dial indicator gage, and a second bore traversing the first bore; a gage bar slidable and rotatable in said second bore and having a plurality of movement translating grooves, the side walls of which bear different angular relation to the axis of the gage bar, said side walls adapted to move said sensing tip in the axis of the first bore upon movement of said gage bar in the axis of the second bore; and a lever means disposed diametrically with respect to said gage bar, said lever means bearing intermediate of its ends against an end of said gage bar, and forming an arm pivotally connected with said body structure, and a free arm forming a sensing tip at its extremity.

References Cited in the file of this patent

UNITED STATES PATENTS

| Number | Name | Date |
|---|---|---|
| 1,079,169 | Fuchs | Nov. 18, 1913 |
| 2,587,099 | Bishop | Feb. 26, 1952 |